United States Patent
Li et al.

(10) Patent No.: US 11,841,498 B2
(45) Date of Patent: Dec. 12, 2023

(54) OPTICAL SCANNER AND ELECTROPHOTOGRAPHIC IMAGE FORMING APPARATUS

(71) Applicant: Zhuhai Pantum Electronics Co., Ltd., Zhuhai (CN)

(72) Inventors: Ronghua Li, Zhuhai (CN); Chao Wang, Zhuhai (CN); Dongning Wang, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 92 days.

(21) Appl. No.: 17/526,900

(22) Filed: Nov. 15, 2021

(65) Prior Publication Data
US 2022/0075182 A1 Mar. 10, 2022

Related U.S. Application Data

(63) Continuation of application No. PCT/CN2020/088756, filed on May 6, 2020.

(30) Foreign Application Priority Data

May 30, 2019 (CN) .......................... 201910468141.9

(51) Int. Cl.
*G02B 26/08* (2006.01)
*G02B 26/12* (2006.01)
(Continued)

(52) U.S. Cl.
CPC ............ *G02B 26/124* (2013.01); *B41J 2/442* (2013.01); *B41J 2/471* (2013.01);
(Continued)

(58) Field of Classification Search
CPC .............. G02B 26/0816; G02B 26/124; G02B 27/4227; B41J 2/442; B41J 2/471
See application file for complete search history.

(56) References Cited

U.S. PATENT DOCUMENTS 7,136,208 B2   11/2006   Yoshida et al.
8,213,067 B2    7/2012   Saisho
(Continued)

FOREIGN PATENT DOCUMENTS

CN    1497269 A    5/2004
CN    1769948 A    5/2006
(Continued)

OTHER PUBLICATIONS

The World Intellectual Property Organization (WIPO) International Search Report With Translation and Written Opinion for PCT/CN2020/088756 dated Jul. 30, 2020 6 Pages (including translation).

*Primary Examiner* — Justin Seo
*Assistant Examiner* — Kendrick X Liu
(74) *Attorney, Agent, or Firm* — ANOVA LAW GROUP, PLLC (57) ABSTRACT

Optical scanner and electrophotographic image forming apparatus are provided. The optical scanner includes a light source, configured to emit a light beam; an optical deflector, configured to deflect the light beam emitted from the light source; a first optical unit, arranged there-between and including a refraction unit and a diffraction unit; and a second optical unit, arranged in a light exit direction of the optical deflector and configured to make the light beam deflected by the optical deflector form an image on a scanning target surface. A range of a ratio of a refractive power $\Phi_r$ to a diffractive power $\Phi_d$ of the first optical unit in a main scanning direction is $0.3<\Phi_r/\Phi_d<0.5$; and a range of a ratio of a refractive power $\Phi_s$ to a diffractive power $\Phi_n$ of the first optical unit in a sub scanning direction is $0.7<\Phi_s/\Phi_n<1.0$.

11 Claims, 5 Drawing Sheets

(51) Int. Cl.
*G02B 27/42* (2006.01)
*B41J 2/44* (2006.01)
*B41J 2/47* (2006.01)
*G03G 15/043* (2006.01)

(52) U.S. Cl.
CPC ....... *G02B 26/0816* (2013.01); *G02B 26/127* (2013.01); *G02B 27/4227* (2013.01); *G03G 15/0435* (2013.01)

(56) References Cited

U.S. PATENT DOCUMENTS

| | | | |
|---|---|---|---|
| 8,797,622 B2 | 8/2014 | Hoshino et al. | |
| 2006/0092492 A1* | 5/2006 | Ishibe | G02B 27/4227 359/219.1 |
| 2007/0285781 A1 | 12/2007 | Seki et al. | |
| 2011/0229205 A1 | 9/2011 | Kudo et al. | |
| 2014/0085696 A1* | 3/2014 | Hoshino | G02B 5/1895 359/207.7 |
| 2014/0160546 A1* | 6/2014 | Hoshino | G02B 7/008 359/206.1 |

FOREIGN PATENT DOCUMENTS

| | | | |
|---|---|---|---|
| CN | 101311771 A | 11/2008 | |
| CN | 101377570 A | 3/2009 | |
| CN | 103293569 A | 9/2013 | |
| CN | 110208942 A | 9/2019 | |
| JP | 2013076807 A | 4/2013 | |

* cited by examiner

OPTICAL SCANNER AND ELECTROPHOTOGRAPHIC IMAGE FORMING APPARATUS

CROSS-REFERENCE TO RELATED APPLICATION

This application is a continuation of International Application No. PCT/CN2020/088756, filed on May 6, 2020, which claims priority to Chinese patent application No. 201910468141.9, entitled "Optical Scanning Unit and Electrophotographic Image Forming Apparatus", filed on May 30, 2019, in the China National Intellectual Property Administration, the entirety of which is incorporated herein by their reference.

TECHNICAL FIELD

The present disclosure generally relates to the field of laser printing technology and, more particularly, relates to an optical scanner and an electrophotographic image forming apparatus.

BACKGROUND

Currently, an electrophotographic image forming apparatus includes an optical scanning unit. The optical scanning unit scans the light modulated by image information onto the surface of a photoreceptor and uses a deflection guide device to deflect and scan the light along a main scanning direction. The light emitted from the light source is focused on the surface of the photoreceptor after passing through a collimator lens, a cylindrical lens, and an F-θ lens (flat field focusing lens).

In order to reduce the cost of the optical scanning unit, the collimator lens is normally made of a plastic material. However, due to a relatively large expansion coefficient of the plastic material, it is easy to cause the refractive index of the collimator lens to change according to temperature change after the internal temperature of the optical scanning unit in operation increases; and furthermore, the focus position where the light emitted from the light source is focused on the surface of the photoreceptor changes. In addition, as the temperature of the light source increases, the wavelength of the light emitted from the light source becomes longer, which also causes the focus position of the light beam focused on the surface of the photoreceptor to change. When the focus position where the light emitted from the light source is focused on the surface of the photoreceptor changes, the light may be incorrectly focused on the photoreceptor, which may affect final printing effect and reduce image printing quality.

SUMMARY

The objective of the present disclosure is to provide an optical scanner and an electrophotographic image forming apparatus, which can compensate the focus shift of the light beam caused by the refractive index and wavelength change of the optical scanner due to temperature change, thereby improving image printing quality.

One aspect of embodiments of the present disclosure provides an optical scanner, including a light source, configured to emit a light beam; an optical deflector, configured to deflect the light beam emitted from the light source; a first optical unit, arranged between the light source and the optical deflector, where the first optical unit includes a refraction unit and a diffraction unit; and a second optical unit, arranged in a light exit direction of the optical deflector and configured to make the light beam deflected by the optical deflector form an image on a scanning target surface. A range of a ratio of a refractive power $\Phi_r$ to a diffractive power $\Phi_d$ of the first optical unit in a main scanning direction is $0.3<\Phi_r/\Phi_d<0.5$; and a range of a ratio of a refractive power $\Phi_s$ to a diffractive power $\Phi_n$ of the first optical unit in a sub scanning direction is $0.7<\Phi_s/\Phi_n<1.0$.

Another aspect of embodiments of the present disclosure provides an electrophotographic image forming apparatus. The electrophotographic image forming apparatus includes an optical scanner. The optical scanner includes: a light source, configured to emit a light beam; an optical deflector, configured to deflect the light beam emitted from the light source; and a first optical unit, arranged between the light source and the optical deflector and including a refraction unit and a diffraction unit; and a second optical unit, arranged in a light exit direction of the optical deflector and configured to make the light beam deflected by the optical deflector form an image on a scanning target surface. A range of a ratio of a refractive diopter Φr to a diffractive diopter Φd of the first optical unit in a main scanning direction is 0.3Φr/Φd<0.5. A range of a ratio of a refractive diopter Φs to a diffractive diopter Φn of the first optical unit in a sub scanning direction is 0.7<Φs/Φn<1.0. The electrophotographic image forming apparatus further includes: a photosensitive unit capable of forming a latent image on a scanning target surface, a developing unit that develops the latent image on the photosensitive unit into a toner image, a transfer apparatus that transfers the toner image to a transfer medium, and a fixing apparatus that fixes the toner image on the transfer medium.

Embodiments of the present disclosure include the following beneficial effects.

Embodiments of the present disclosure include the optical scanner and the electrophotographic image forming apparatus. The optical scanner may include the light source, the optical deflector, the first optical unit, and the second optical unit, where the first optical unit may be arranged between the light source and the optical deflector; and the first optical unit may include the refraction unit and the diffraction unit. The light emitted from the light source may be compensated by the refraction unit and the diffraction unit respectively. The change in refractive index and wavelength caused by the temperature change may cause the focus shift of the light, such that the focal length of the light exited from the first optical unit may be relatively stable, and the affected influence of the temperature change may be relatively small. The second optical unit may also be arranged in the light exit direction of the optical deflector; and the second optical unit may be configured to focus the light beam deflected by the optical deflector, such that the light beam may form an image on the scanning target surface. The refractive power and the diffractive power of the first optical unit in the main scanning direction are $\Phi_r$ and $\Phi_d$, and the ratio of $\Phi_r$ to $\Phi_d$ may range from about 0.3 to about 0.5. The refractive power and the diffractive power of the first optical unit in the sub scanning direction are $\Phi_s$ and $\Phi_n$, and the ratio of $\Phi_s$ to $\Phi_n$ may range from about 0.7 to about 1.0. When the ratio of $\Phi_r$ to $\Phi_d$ and the ratio of $\Phi_s$ to $\Phi_n$ are respectively set in the above-mentioned ranges, the optical scanner may finally make the focus position change of the light beam which is emitted from the light source and focused on the surface of the scanning target to be less affected by temperature, thereby improving the image quality of the optical scanner on the scanning target surface.

BRIEF DESCRIPTION OF THE DRAWINGS

In order to clearly illustrate the technical solutions in exemplary embodiments of the present disclosure, the drawings required to be used in exemplary embodiments are briefly described hereinafter. It should be understood that the following drawings only illustrate certain embodiments of the present disclosure and should not be regarded as the scope limitation. Other related drawings may be obtained according to such drawings by those skilled in the art without creative work.

DETAILED DESCRIPTION

In order to make the objectives, technical solutions, and advantages of embodiments of the present disclosure clearer, the technical solutions in embodiments of the present disclosure are described clearly and completely in conjunction with the accompanying drawings in embodiments of the present disclosure. Obviously, the described embodiments are a part of embodiments of the present disclosure, rather than all embodiments. The components of embodiments of the present disclosure generally described and illustrated in the drawings herein may be arranged and designed in various different configurations.

Therefore, the following detailed description of embodiments of the present disclosure provided in the accompanying drawings is not intended to limit the scope of the claimed invention, but merely represents selected embodiments of the present disclosure. Based on embodiments of the present disclosure, all other embodiments obtained by those skilled in the art without creative work shall fall within the protection scope of the present disclosure.

In the description of the present disclosure, it should be noted that the orientation or position relationships indicated by the terms "center", "upper", "lower", "inner", and the like are the orientation or position relationships based on the drawings, or the orientation or position relationships that the disclosed product is usually placed in use. It is only for the convenience of describing the present disclosure and simplifying the description, rather than indicating or implying that the device or element referred to must have a specific orientation, be constructed and operated in a specific orientation, and therefore cannot be understood as a limitation of the present disclosure.

The present disclosure provides an optical scanner and an electrophotographic image forming apparatus, which relates to the field of laser printing technology and is capable of compensating the focus shift of the light beam caused by the refractive index and wavelength change of the optical scanner due to temperature change, thereby improving image printing quality. The optical scanner includes a light source, configured to emit a light beam; an optical deflector, configured to deflect the light beam emitted from the light source; a first optical unit, arranged between the light source and the optical deflector. The first optical unit includes a refraction unit and a diffraction unit; and a second optical unit, arranged in a light exit direction of the optical deflector and configured to make the light beam deflected by the optical deflector form an image on a scanning target surface. A range of a ratio of a refractive power $\Phi_r$ to a diffractive power $\Phi_d$ of the first optical unit in a main scanning direction is $0.3<\Phi_r/\Phi_d<0.5$; and a range of a ratio of a refractive power D to a diffractive power $\Phi_n$ of the first optical unit in a sub scanning direction is $0.7<\Phi_s/\Phi_n<1.0$.

Figure 1:
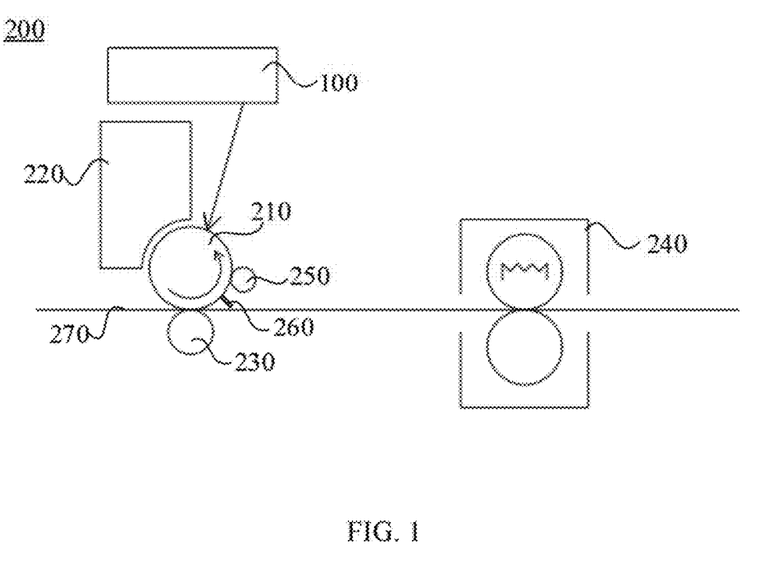
FIG. 1 illustrates a structural schematic of an electrophotographic image forming apparatus according to various embodiments of the present disclosure.
Figure 2:
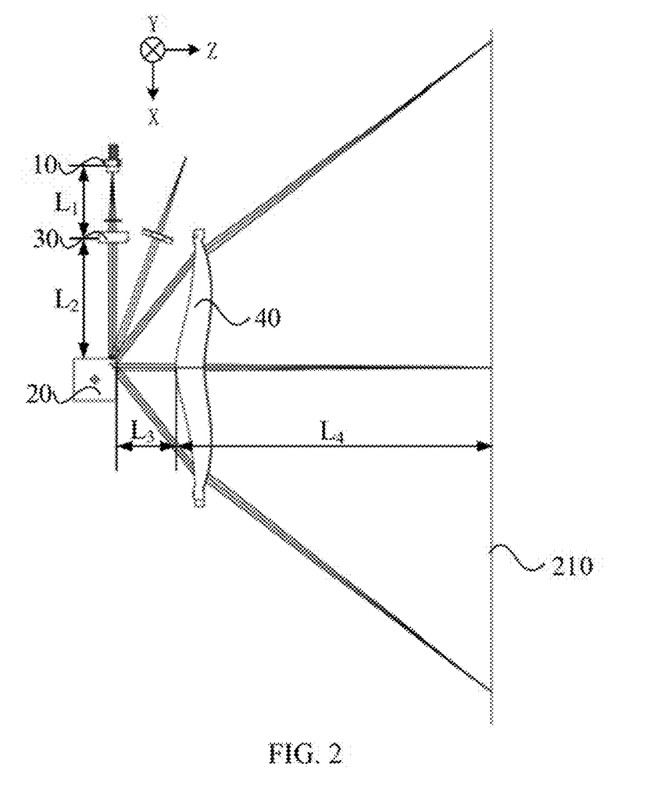
FIG. 2 illustrates a schematic of an optical path in a main scanning direction of an optical scanner according to various embodiments of the present disclosure.

As shown in FIGS. 1-2, various embodiments of the present disclosure provide an optical scanner 100 including a light source 10 for emitting a light beam; an optical deflector 20 for deflecting the light beam emitted from the light source 10; the first optical unit 30 arranged between the light source 10 and the optical deflector 20, where the first optical unit 30 may include a refraction unit 31 and a diffraction unit 32; the second optical unit 40 which is arranged in the light exit direction of the optical deflector 20 and configured to focus the light beam deflected by the optical deflector 20 on the scanning target surface for image forming.

The range of the ratio of the refractive power $\Phi_r$ to the diffractive power $\Phi_d$ of the first optical unit 30 in the main scanning direction may be:

$$0.3<\Phi_r/\Phi_d<0.5 \qquad (1)$$

The range of the ratio of the refractive power $\Phi_s$ to the diffractive power $\Phi_n$ of the first optical unit 30 in the sub scanning direction may be:

$$0.7<\Phi_s/\Phi_n<1.0 \qquad (2)$$

The sub scanning direction may be the rotational movement direction of the scanning target surface; and the main scanning direction and the sub scanning direction may be perpendicular to each other.

When the optical scanner 100 works normally, the light source 10 may emit the light beam, and the light beam may be directed to the optical deflector 20 after collimating by the first optical unit 30; the light beam may be deflected and scanned along the main scanning direction by the optical deflector 20; and the deflected light beam exiting from the optical deflector 20 may be focused on the scanning target surface after passing through the second optical unit 40

It should be noted that, firstly, the optical deflector 20 may normally include a polygon mirror and a driving device; the driving device may be in a transmission connection with the polygon mirror; the light beam emitted from the light source 10 may be directed to the polygon mirror of the optical deflector 20 after passing through the first optical unit 30; the rotating polygon mirror may deflect the light beam to the second optical unit 40; the polygon mirror may be driven by the driving device to rotate along its rotation axis, such that the light beam reflected by the polygon mirror can be deflected to enter the second optical unit 40 at different angles, thereby realizing the light beam scanning along the main scanning direction.

Secondly, the specific form of the light source 10 may not be limited in embodiments of the present disclosure. Exemplarily, the light source 10 may be an LD (laser diode) light source to emit a laser beam with a relatively small divergence angle. Obviously, in a certain case, the light source 10 may also be set as an LED (light-emitting diode) light source, or the like. The light source 10 for emitting the light beam may emit the light beam at a certain exit angle.

Thirdly, in order to make the focus of the focused exit light after the light beam deflected by the optical deflector 20 enter the second optical unit 40 at different angles to be relatively stable on the scanning target surface, the second optical unit 40 may be normally configured as a flat field focusing lens (f-θ lens).

Fourthly, when the light beam emitted from the light source 10 passes through the first optical unit 30, the light beam may normally exit after sequentially passing through the refraction unit 31 and the diffractive unit 32 on the first optical unit 30. The refractive powers of the refraction unit 31 and the diffractive unit 32 may both change with temperature change. The optical power of the refraction unit 31 may change according to temperature change, such that the optical path of the light that has passed through the refraction unit 31 may be distorted. When the ambient temperature changes, the wavelength of the light emitted from the light source 10 may also change, and the optical path of the light that has passed through the refraction unit 31 may change. The optical power of the diffraction unit 32 may change according to the wavelength change of the light. However, the change tendency of the optical power of the refraction unit 31 with temperature may be opposite to the change tendency of the wavelength caused by the change of the optical power of the diffractive unit 32 with temperature. Therefore, when the ratio range of the refractive power $\Phi_r$ to the diffractive power Od of the first optical unit 30 in the main scanning direction is $0.3<\Phi_r/\Phi_d<0.5$, and when the ratio range of the refractive power $\Phi_s$ to the diffractive power $\Phi''$ of the first optical unit 30 in the sub scanning direction is $0.7<\Phi_s/\Phi_n<1.0$, the optical power of the refraction unit 31 and the optical power of the diffractive unit 32 may better offset the optical power change caused by temperature change, thereby reducing the temperature influence on the focus and collimation effect of the first optical unit 30.

The optical scanner 100 provided by embodiments of the present disclosure may include the light source 10, the optical deflector 20, the first optical unit 30, and the second optical unit 40, where the first optical unit 30 may be arranged between the light source 10 and the optical deflector 20; and the first optical unit 30 may include the refraction unit 31 and the diffraction unit 32. The light emitted from the light source 10 may be compensated by the refraction unit 31 and the diffraction unit 32 respectively. The change in refractive index and wavelength caused by the temperature change may cause the focus shift of the light, such that the focal length of the light exited from the first optical unit 30 may be relatively stable, and the affected influence of the temperature change may be relatively small. The second optical unit 40 may also be arranged in the light exit direction of the optical deflector 20; and the second optical unit 40 may be configured to focus the light beam deflected by the optical deflector 20, such that the light beam may form an image on the scanning target surface. The refractive power and the diffractive power of the first optical unit 30 in the main scanning direction are $\Phi_r$ and $\Phi_d$, and the ratio of $\Phi_r$ to $\Phi_d$ may range from about 0.3 to about 0.5. The refractive power and the diffractive power of the first optical unit 30 in the sub scanning direction are $\Phi_s$ and $\Phi''$, and the ratio of $\Phi_s$ to $\Phi_n$ may range from about 0.7 to about 1.0. When the ratio of $\Phi_r$ to $\Phi_d$ and the ratio of $\Phi_s$ to $\Phi_n$ are respectively set in the above-mentioned ranges, the optical scanner 100 may finally make the focus position change of the light beam which is emitted from the light source 10 and focused on the surface of the scanning target to be less affected by temperature, thereby improving the image quality of the optical scanner 100 on the scanning target surface.

For the ratio range of the refractive power $\Phi_r$ to the diffractive power $\Phi_d$ of the first optical unit 30 in the main scanning direction and the ratio range of the refractive power $\Phi_s$ to the diffractive power $\Phi_n$ of the first optical unit 30 in the sub scanning direction, experimental tests show that the refractive power of the refraction unit 31 and the refractive power of the diffractive unit 32 may satisfy the following relationships, which may better compensate the focus position change caused by temperature change. That is, the ratio range of the ratio $(\Phi_r/\Phi_d)$m (i.e., $(\Phi_r/\Phi_d)$) of the refractive power to the diffractive power in the main scanning direction of the first optical unit 30 and the ratio $(\Phi_s/\Phi_n)$s of the refractive power and the diffractive power in the sub scanning direction of the first optical unit 30 may be:

$$0.3<(\Phi_r/\Phi_d)m/(\Phi_s/\Phi_n)s<0.5 \tag{3}$$

Desirable printing compensation effect due to the temperature change may be obtained by satisfying expression (3).

In addition, the change in the wavelength of the light source caused by the temperature change is $d_\lambda/d_T$, where:

$$d_\lambda/d_T<0.25 \tag{4}$$

It should be noted that λ denotes the wavelength, $d_\lambda$ denotes the wavelength change, T denotes the temperature, and $d_T$ denotes the temperature change.

Specifically, the relationship between the wavelength of the light source and the temperature is shown in Table 1.

TABLE 1

| Temperature (° C.) | Wavelength (nm) |
| --- | --- |
| 25 | 788 |
| 35 | 790.2 |
| 45 | 792.4 |
| 55 | 794.6 |
| 60 | 795.7 |

It can be seen from the above-mentioned expression (4) that the temperature change may cause the wavelength of the light source to change accordingly.

For example, as shown in Table 1, when the temperature is 25° C., the wavelength λ is 788 nm; and when the temperature is 60° C., the wavelength λ is 795.7 nm. The wavelength λ values corresponding to the temperatures of 25° C. and 60° C. may be plugged into expression (4) to calculate the differences, and $d_\lambda/d_T=7.7/35=0.22$, which satisfies expression (4). That is, it can be proved that, within the temperature change range shown in above-mentioned Table 1, the optical scanner of embodiments of the present disclosure may easily obtain a desirable printing compensation effect.

Optionally, as shown in FIG. 2, the first optical unit 30 may include an anamorphic lens or include an independent collimator lens and an independent cylindrical lens.

Specifically, the first optical unit 30 may include a single anamorphic lens, and the first optical unit 30 may perform both functions of the collimator lens and the cylindrical lens. The main optical axis of the first optical unit 30 may be arranged corresponding to the light source 10, such that the light beam emitted from the light source 10 may pass through the first optical unit 30, and the first optical unit 30 may collimate the light emitted from the light source 10. The first optical unit 30 may be used as a single piece, which reduces assembly errors, facilitates processing and has a small amount of deformation affected by temperature. In the conventional optical scanning unit, the first optical unit 30 may also be the combination of the collimator lens and the cylindrical lens; meanwhile, the focus shift of the light beam affected by temperature may be compensated, which is beneficial for improving the printing quality.

Optionally, the first optical unit 30 may be made of a plastic material; and the refraction unit 31 and the diffraction unit 32 may be formed in a single piece on the surface of the anamorphic lens on the incident light side and the exit light side by injection molding.

In addition, the diffraction surface of the diffraction unit 32 may be sawtooth-shaped or step-shaped. Optionally, the diffraction surface may be step-shaped. The diffraction unit 32 may be represented by the phase polynomial of expression 5:

$$\psi(r)=2\pi/m\lambda(C_1 r^2 + C_2 r^4 + C_3 r^6 + C_4 r^8) \quad (5)$$

where $\psi$ denotes the phase of the diffraction unit 32 in the diffraction zone where the diffraction unit 32 is formed, that is, the phase of the diffraction unit 32 in the region at a distance r from the center of the diffraction surface of the diffraction unit 32, m denotes the diffraction order, $\lambda$ denotes the wavelength of the light beam emitted from the light source 10, and $C_1$, $C_2$, $C_3$, and $C_4$ denote phase coefficients.

Specifically, the first optical unit 30 can be made of a plastic material and manufactured by direct injection molding or die-casting, which may be beneficial for reducing the manufacturing cost of the first optical unit 30. The refraction unit 31 and the diffraction unit 32 may be respectively arranged on two sides of the first optical unit 30. Exemplarily, the structures of the refraction unit 31 and the diffraction unit 32 may be directly formed on two sides of the first optical unit 30, which may be beneficial for reducing the volume of the entire optical scanning unit 100, reducing assembly steps, reducing manufacturing costs, and improving manufacturing efficiency. Meanwhile, the refraction unit 31 and the diffraction unit 32 may also compensate the focus position deviation caused by the temperature change, which may be beneficial for improving the printing quality.

In one embodiment, the optical scanning unit 100 may further include a support unit 50 for support the first optical unit 30, where the focal length of the first optical unit 30 is $f_1$, the focal length of the second optical unit 40 is $f_2$, the thermal expansion coefficient of the first optical unit 30 is $K_1$, the thermal expansion coefficient of the support unit 50 is $K_2$, $K_1$=0.000055, and $K_2$=0.000035.

Desirable printing compensation effect may be obtained when the focal length of the first optical unit 30, the focal length of the second optical unit 40, the thermal expansion coefficient of the first optical unit 30, and the thermal expansion coefficient of the support unit 50 satisfy the following expression (6):

$$(1-(f_1/f_2))\times 0.18 < f_1 \times \Phi_s \times K_2/K_1 < (1+(f_1/f_2))\times 0.25 \quad (6)$$

As one embodiment of the present disclosure, the wavelength of the light emitted from the light source 10 is 790.2 nm. The thermal expansion coefficient $K_1$ of the first optical unit 30 is 0.000055, the thermal expansion coefficient $K_2$ of the support unit 50 is 0.000035, the focal length in the main scanning direction of the first optical unit 30 is 20 mm, the focal length in the sub scanning direction of the first optical unit 30 is 14.238 mm, the focal length of the second optical unit 40 in the main scanning direction is 197.575 mm, and the focal length of the second optical unit 40 in the sub scanning direction is 24.611 mm.

Referring to Table 2 and FIG. 2, the distance between the light source 10 and the first optical unit 30 is $L_1$, the distance between the first optical unit 30 and the optical deflector 20 is $L_2$, the distance between the optical deflector 20 and the second optical unit 40 is $L_3$, and the distance between the second optical unit 40 and a photosensitive unit 210 is $L_4$.

TABLE 2

| | Thermal expansion coefficient | Distance between optical elements (mm) | | Optical power (D) | |
|---|---|---|---|---|---|
| Light source 10 | — | — | | — | |
| First optical unit 30 | 0.000055 | $L_1$ = 23.311 | Refraction unit 31 | Main scanning direction | 0.0144 |
| | | | | Sub scanning direction | 0.0359 |
| | | | Diffraction unit 32 | Main scanning direction | 0.0365 |
| | | | | Sub scanning direction | 0.0365 |
| Optical deflector 20 | — | $L_2$ = 41.689 | | — | |
| Second optical unit 40 | 0.00004 | $L_3$ = 21.9 | | | |
| Photoreceptor | — | $L_4$ = 104.85 | | — | |
| Support frame | 0.000035 | — | | — | |

In the above-mentioned example in Table 2, corresponding values may be respectively substituted for the focal length of the first optical unit 30, the focal length of the second optical unit 40, the thermal expansion coefficient of the first optical unit 30, and the thermal expansion coefficient of the support unit 50, in the refraction unit 31 in the main scanning direction, and the following result may be obtained:

$$(1-(f_1/f_2))\times 0.18=0.1617791 < f_1\times\Phi_r\times K_2/K_1 = 0.183272727 < (1+(f_1/f_2))\times 0.25 = 0.2753068$$

It can be seen that the refraction unit 31 in the main scanning direction may satisfy the above-mentioned expression (6). Herein, the substituting process of each value of the sub scanning unit of the refraction unit 31 can refer to the substituting process of the sub scanning unit of the refraction unit 31, and the result may be verified by those skilled in the art themselves, which may not be described in detail herein.

In the equation of expression (5), it is assumed that $r=x^2+y^2$, when the intersection between the optical axis and the first optical unit 30 is the origin, x and y may be the coordinate values of the main scanning direction X and the sub scanning direction Y, respectively; and if $C_2$ to $C_4$ are both equal to 0, the optical power $\Phi_d$ of the diffraction unit 32 may be expressed as $\Phi_d = -2\times C_1$.

As one embodiment of the present disclosure, when the wavelength of the light radiated from the light source 10 is 790.2 nm, the focal lengths f1 of the first optical unit 30 may be configured to be 7.88 mm, 14.238 mm, 20 mm, 28.98 mm, 35.22 mm, and 42.32 mm, respectively. When the temperature changes, the relationship values shown in Table 3 may be obtained. Table 3 includes the relationship between the ratio $\Phi_r/\Phi_d$ of the refractive power to the diffractive power of the optical scanner 100 in the main scanning direction and the focus position change.

TABLE 3

| $f_1$ (mm) | Focus position change (mm) | $\Phi_r/\Phi_d$ | $f_1\times\Phi_r\times K_2/K_1$ | $C_1$ | $\Phi_d$ |
|---|---|---|---|---|---|
| 7.88 | 0.82165 | 0.31456 | 0.120259102 | −0.03812 | 0.07624 |
| 14.238 | 0.364972 | 0.351245 | 0.167732196 | −0.026275 | 0.05255 |
| 20 | 0.13326 | 0.394521 | 0.183272727 | −0.01825 | 0.0365 |
| 28.98 | 0.1231256 | 0.433256 | 0.186327462 | −0.01166 | 0.02332 |
| 35.22 | 0.10132546 | 0.453255 | 0.175440261 | −0.008635 | 0.01727 |
| 42.32 | 0.0883564 | 0.495645 | 0.114126857 | −0.004275 | 0.00855 |

Figure 6:
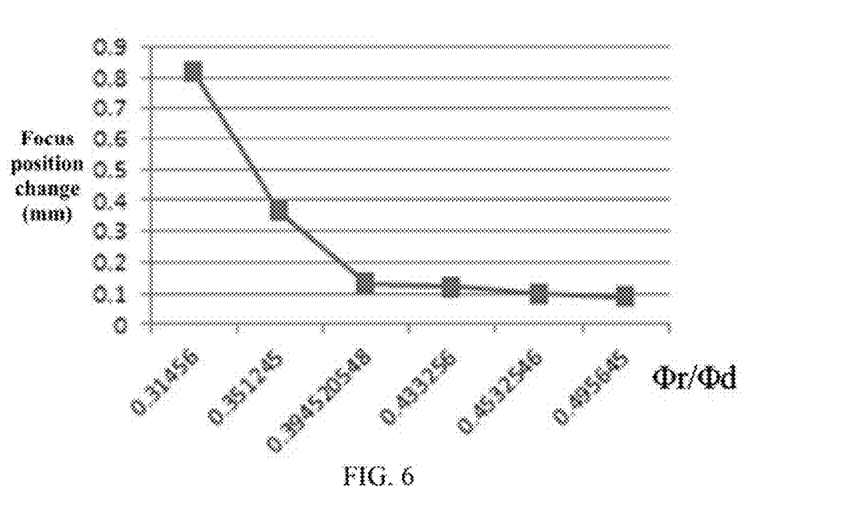
FIG. 6 illustrates a relationship curve of focus change and $\Phi_r/\Phi_d$ in a main scanning direction according to various embodiments of the present disclosure.

It can be obtained from Table 3 that the ratio of the refractive power $\Phi_r$ to the diffractive power $\Phi_d$ of the first optical unit 30 in the main scanning direction satisfies the expression: $0.3<\Phi_r/\Phi_d<0.5$, and when the focal lengths $f_1$ of the first optical unit 30 are respectively 14.238 mm, 20 mm, 28.98 mm, and 35.22 mm, it may satisfy the expression $(1-(f_1/f_2))\times 0.18 < f_1\times\Phi_r\times K_2/K_1 < (1+(f_1/f_2))\times 0.25$. According to the example values shown in Table 3, the relationship curve of focus change and $\Phi_r/\Phi_d$ in the main scanning direction may be drawn, as shown in FIG. 6.

Optionally, the focal length $f_1$ of the first optical unit 30 in the main scanning direction of the optical scanner 100 may be designed to be 20 mm. In the actual design of the optical scanner 100, the smaller the focal length is, the greater the focus position change is; therefore, greater compensation may be required to obtain desirable image forming quality. On the contrary, to make the focus position change smaller, it is necessary to set a larger focal length, such that the volume of the image forming apparatus may be increased. Therefore, in order to reduce the cost and volume, the focal lengths of the first optical unit 30 and the second optical unit 40 may be shortened as possible under the premise of not affecting the printing quality and comprehensively considering the manufacturing cost, thereby achieving the reduction of the volume of the optical scanner 100 and an electrophotographic image forming apparatus.

As one embodiment of the present disclosure, within the operating temperature of the printer, when the temperature changes, the focus position may change accordingly. The wavelength of the light emitted from the light source 10 is 790.2 nm, the thermal expansion coefficient of the first optical lens is 0.000055, the thermal expansion coefficient of the support frame is 0.000035, and the focal length $f_1$ of the first optical unit 30 is 20 mm. When the temperature changes, the focus position change in the main scanning direction may be based on the temperature change inside the optical scanner 100. The relationship between the measured focus position change and $\Phi_r/\Phi_d$ may refer to Table 4 in detail.

TABLE 4

| Tem (° C.) | Wavelength (nm) | Focus position change (mm) | $\Phi_r \times \Phi_d$ | $f_1 \times \Phi_r \times K_2/K_1$ | $K_1$ | $K_2$ | $C_1$ | $\Phi_d$ |
|---|---|---|---|---|---|---|---|---|
| 25 | 788 | 0.01246 | 0.32456 | 0.1665056 | 0.000051 | 0.000031 | −0.0211 | 0.0422 |
| 35 | 790.2 | 0.13326 | 0.39452055 | 0.1832727 | 0.000055 | 0.000035 | −0.01825 | 0.0365 |
| 45 | 792.4 | 0.13538 | 0.4124546 | 0.197843 | 0.000061 | 0.000038 | −0.0193 | 0.0386 |
| 55 | 794.6 | 0.1375 | 0.433256 | 0.1937587 | 0.000065 | 0.000041 | −0.0177 | 0.0354 |
| 60 | 795.7 | 0.13962 | 0.4732546 | 0.1814698 | 0.000071 | 0.000045 | −0.0151 | 0.0302 |

Figure 7:
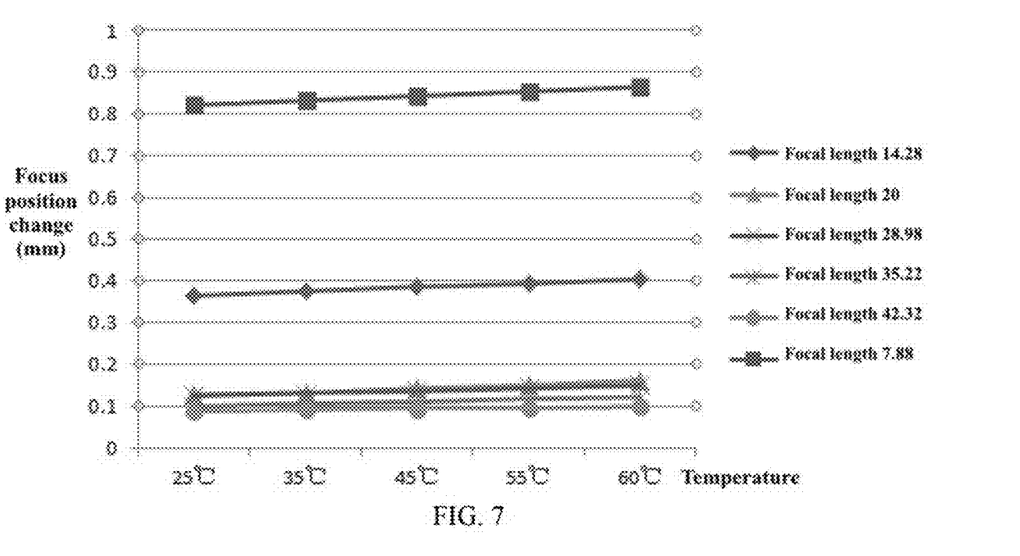
FIG. 7 illustrates a relationship curve of focus change and temperature in a main scanning direction according to various embodiments of the present disclosure.

According to the design example values shown in Table 4, the relationship curve between the focus position change in the main scanning direction, the temperature and the focal length may be drawn, as shown in FIG. 7. It can be seen from FIG. 7 that as the temperature changes, the expression 1 $0.3 < \Phi_r/\Phi_d < 0.5$ may be satisfied, and when the focal length $f_1$ of the first optical unit 30 in the main scanning direction is 20 mm which satisfies $(1-(f_1/f_2)) \times 0.18 < f_1 \times \Phi_r \times K_2/K_1 < (1+(f_1/f_2)) \times 0.25$, the focus position change may be small. It can be seen that the focal length change of the first optical unit 30 may be well compensated.

As one embodiment of the present disclosure, when the wavelength of the light radiated from the light source 10 is 790.2 nm, the focal lengths $f_1$ of the first optical unit 30 may be set to be 7.88 mm, 14.238 mm, 20 mm, 28.98 mm, 35.22 mm, and 42.32 mm, respectively. The relationship between the ratio $\Phi s/\Phi n$ of the refractive power and the diffractive power of the optical scanner 100 in the sub scanning direction and the focus position may refer to Table 5.

TABLE 5

| $f_1$ (mm) | Focus position change (mm) | $\Phi_s/\Phi_n$ | $f_1 \times \Phi_s \times K_2/K_1$ | $C_1$ | $\Phi_n$ |
|---|---|---|---|---|---|
| 7.88 | 0.26465 | 0.712333 | 0.043935922 | −0.00615 | 0.0123 |
| 14.238 | 0.18548 | 0.9836 | 0.27626 | −0.01550 | 0.031 |
| 20 | 0.105222 | 0.984532 | 0.413503 | −0.01650 | 0.033 |
| 28.98 | 0.07222 | 0.985562 | 0.699758876 | −0.01925 | 0.0385 |
| 35.22 | 0.06512 | 0.988124 | 0.881433017 | −0.0199 | 0.0398 |
| 42.32 | 0.06025 | 0.99562 | 1.10469361 | −0.0206 | 0.0412 |

It can be seen from Table 5 that $\Phi_s/\Phi_n$ may satisfy the expression $0.7 < \Phi_s/\Phi_n < 1$, and when the focal lengths $f_1$ of the first optical unit 30 are 14.238 mm and 20 mm, it may satisfy the expression $(1-(f_1/f_2)) \times 0.18 < f_1 \times \Phi_s \times K_2/K_1 < (1+(f_1/f_2)) \times 0.25$. The relationship curve between the focus change in the sub scanning direction and $\Phi_s/\Phi_n$ may specifically refer to FIG. 8.

Optionally, the focal length $f_1$ of the first optical unit 30 in the sub scanning direction of the optical scanner 100 may be designed to be 14.238 mm. In the actual design of the optical scanner 100, the smaller the focal length is, the greater the focus position change is; therefore, greater compensation may be required to obtain desirable image forming quality. On the contrary, to make the focus position change smaller, it is necessary to set a larger focal length, such that the volume of the image forming apparatus may be increased. Therefore, in order to reduce the cost and volume, the focal lengths of the first optical unit 30 and the second optical unit 40 may be shortened as possible under the premise of not affecting the printing quality and comprehensively considering the manufacturing cost, thereby achieving the reduction of the volume of the optical scanner 100 and the electrophotographic image forming apparatus.

As one embodiment of the present disclosure, when the temperature changes, the focus position may change accordingly. When the temperature changes, the focus position change in the sub scanning direction may be based on the temperature change inside the optical scanner 100. The relationship between the measured focus position change and (D/<d may refer to Table 6 for detail.

TABLE 6

| Temperature (° C.) | Wavelength (nm) | Focus position change (mm) | $\Phi_s/\Phi_n$ | $f_1 \times \Phi_s \times K_1/K_2$ | $C_1$ | $\Phi_n$ |
|---|---|---|---|---|---|---|
| 25 | 788 | −0.01155 | 0.712333 | 0.466254327 | −0.016 | 0.032 |
| 35 | 790.2 | 0.105222 | 0.9836 | 0.326363635 | −0.01550 | 0.031 |
| 45 | 792.4 | 0.1073474 | 0.985465 | 0.326995205 | −0.01425 | 0.0285 |

TABLE 6-continued

| Temperature (° C.) | Wavelength (nm) | Focus position change (mm) | $\Phi_s/\Phi_n$ | $f_1 \times \Phi_s \times K_1/K_2$ | $C_1$ | $\Phi_n$ |
|---|---|---|---|---|---|---|
| 55 | 794.6 | 0.1094728 | 0.988562 | 0.206699327 | −0.0115 | 0.0231 |
| 60 | 795.7 | 0.1115982 | 0.988912 | 0.152831919 | −0.0085 | 0.0172 |

Figure 9:
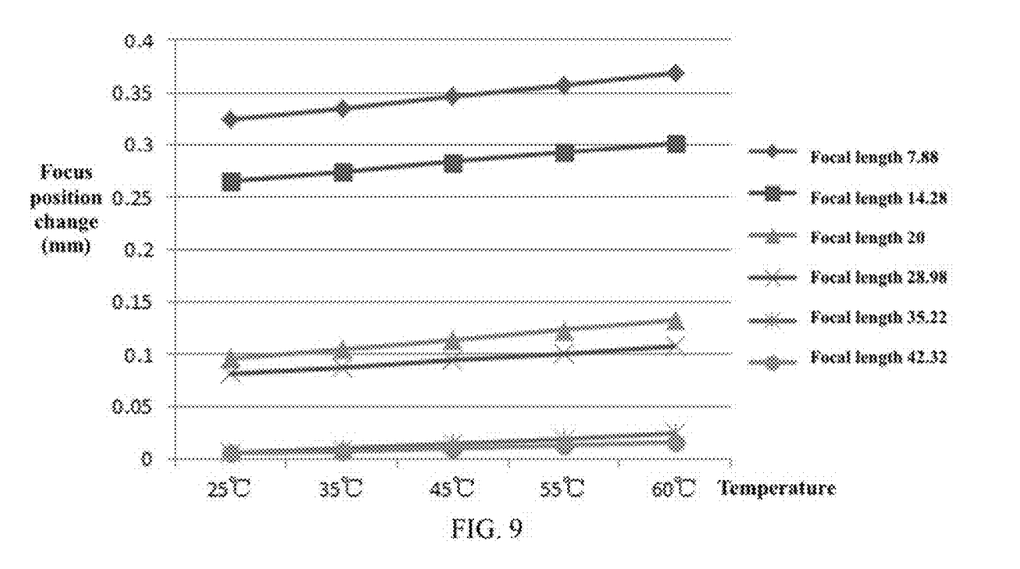
FIG. 9 illustrates a relationship curve of focus change and temperature in a sub scanning direction according to various embodiments of the present disclosure.

According to the design example values shown in Table 6, the relationship curve between the focus position change in the sub scanning direction, the temperature and the focal length may be drawn, as shown in FIG. 9. It can be seen from FIG. 9 that as the temperature changes, the relationship $0.7\Phi_s/\Phi_n<1$ may be satisfied, and when the focal length $f_1$ of the first optical unit 30 in the sub scanning direction is 14.238 mm which satisfies $(1-(f_1)/f_2))\times 0.18 < f_1 \times \Phi_r \times K_2/K_1 < (1+(f_1/f_2))\times 0.25$, the focus position change may be small. It can be seen that the focal length change of the first optical unit 30 may be well compensated.

In addition, in the actual design of the optical scanner 100, it is necessary to shorten the focal lengths of the first optical unit 30 and the second optical unit 40 as possible to achieve the objective of reducing the volume of the optical scanner 100 and the electrophotographic image forming apparatus 200. By measuring the focal length $f_1$ of the first optical unit 30, the refractive power $\Phi_r$ of the refraction unit 31, and the refractive power $\Phi_d$ of the diffractive unit 32, it may be obtained from the measurement result that the position change of the focus of the light beam falls on the scanning target surface varies with different designed focal lengths $f_1$. In addition, the smaller the design value of the focal length $f_1$ is, the more the focus fluctuation likelihood is. The larger the design value of the focal length $f_1$ is, the less the obvious focus fluctuation is. However, the large design value of the focal length $f_1$ may result in the large volume of the optical scanner 100. After measurement and analysis, the focal length $f_1$ of the first optical unit 30 may be optionally set as 20 mm in the main scanning direction and 14.238 mm in the sub scanning direction; and as the temperature changes, the focal length change of the first optical unit 30 may be well compensated, which may improve the printing image quality and realize the device of the optical scanner 100 to be miniaturized.

Referring to FIGS. 6-7, it can be seen from FIG. 7 that the longer the focal length is, the smaller the focus position change in the main scanning direction is; and it can be seen from FIG. 6 that $\Phi_r/\Phi_d$ may infinitely approach 0.5, and the focus position change in the main scanning direction may be smaller. On the contrary, the smaller the focal length is, the greater the focus position change is, and the greater the need for compensation is. In order to reduce cost and volume, it is necessary to make the focal length smaller. If the focal length is sufficiently small, the manufacturing cost of the corresponding first optical unit 30 may be higher. Therefore, in the actual design, it is necessary to consider a balance between the cost of the optical scanner 100 and the first optical unit 30.

Figure 8:
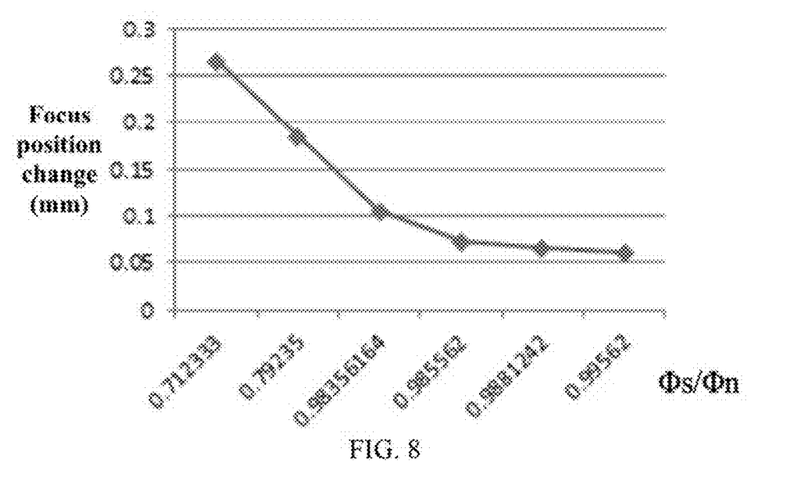
FIG. 8 illustrates a relationship curve of focus change and $\Phi_s/\Phi_n$ in a sub scanning direction according to various embodiments of the present disclosure.

Referring to FIGS. 8-9, it can be seen from FIG. 9 that the longer the focal length is, the smaller the focus position change in the sub scanning direction is; and it can be seen from FIG. 8 that when $\Phi_s/\Phi_n$ infinitely approaches 1, the focus position change in the sub scanning direction may be smaller. On the contrary, the smaller the focal length is, the greater the focus position change is, and the greater the need for compensation is. In order to reduce cost and volume, it is necessary to make the focal length smaller. If the focal length is sufficiently small, the manufacturing cost of the corresponding first optical unit 30 may be higher accordingly. Therefore, in the actual design, it is necessary to consider a balance between the cost of the optical scanner 100 and the first optical unit 30.

As disclosed, in order to reduce cost and volume as possible, in one embodiment, the ratio of the refractive power $\Phi_r$ of the first optical unit 30 in the main scanning direction to the diffractive power $\Phi_d$ may satisfy the inequality $0.35 < \Phi_r/\Phi_d < 0.45$; and the ratio of the refractive power $\Phi_s$ to the diffractive power $\Phi_n$ of the first optical unit 30 in the sub scanning direction may satisfy the inequality $0.98 < \Phi_s/\Phi_n < 1$.

Furthermore, in one embodiment, in conjunction with FIG. 7 and FIG. 9, it may obtain the ratio of the refractive power $\Phi_r$ to the diffractive power $\Phi_d$ of the first optical unit 30 in the main scanning direction, the ratio of the refractive power $\Phi_s$ to the diffractive power $\Phi_n$ of the corresponding first optical unit 30 in the sub scanning direction, the ratio $(\Phi_r/\Phi_d)m$ of the refractive power to the diffractive power in the main scanning direction of the first optical unit 30, and the ratio $(\Phi_s/\Phi_n)s$ of the ratio of the refractive power to the diffractive power in the sub scanning direction of the first optical unit 30, where specific design example values may refer to Table 7.

TABLE 7

| $\Phi_r/\Phi_d$ | $\Phi_s/\Phi_n$ | $(\Phi_r/\Phi_d)m/(\Phi_s/\Phi_n)s$ |
|---|---|---|
| 0.32456 | 0.712333 | 0.45563 |
| 0.351245 | 0.9836 | 0.357115 |
| 0.39452055 | 0.985465 | 0.400339 |
| 0.433256 | 0.988562 | 0.407922 |
| 0.4732546 | 0.988912 | 0.417888 |

By the analysis and comparison of Table 7, it can be seen that the ratio range of the ratio $(\Phi_r/\Phi_d)m$ of the refractive power to the diffractive power in the main scanning direction of the first optical unit 30 and the ratio $(\Phi_s/\Phi_n)s$ of the refractive power and the diffractive power in the sub scanning direction of the first optical unit 30 may satisfy expression (3).

In addition, from the values shown in Table 7, it can be seen that the ratio of the ratio $(\Phi_r/\Phi_d)m$ of the refractive power to the diffractive power in the main scanning direction of the first optical unit 30 and the ratio $(\Phi_s/\Phi_n)s$ of the refractive power and the diffractive power in the sub scanning direction of the first optical unit 30 may satisfy the inequality $0.35 < (\Phi_r/\Phi_d)m/(\Phi_s/\Phi_n)s < 0.45$, which may be the optimal option.

Figure 3:
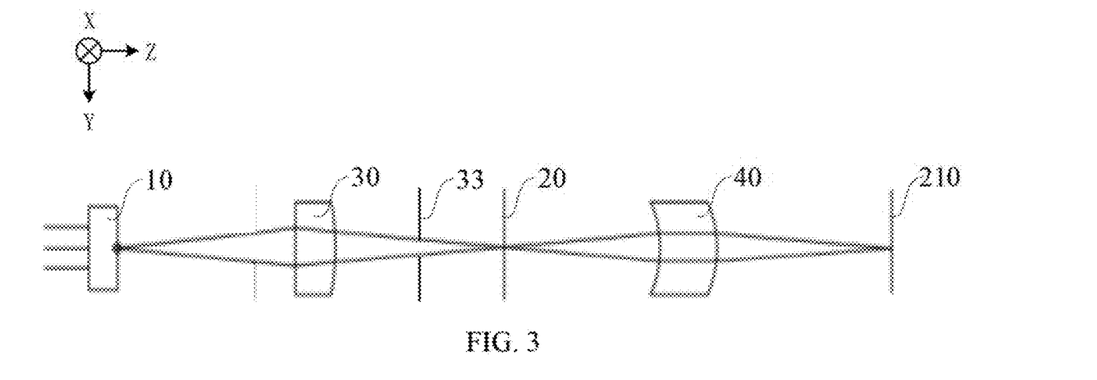
FIG. 3 illustrates a schematic of an optical path in a sub scanning direction of an optical scanner according to various embodiments of the present disclosure.
Figure 4:
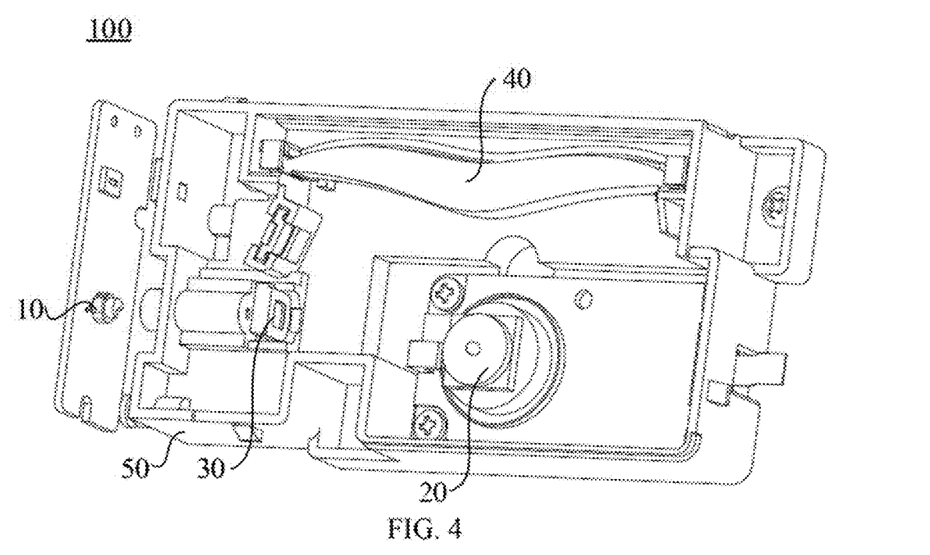
FIG. 4 illustrates a structural schematic of an optical scanner according to various embodiments of the present disclosure.
Figure 5:
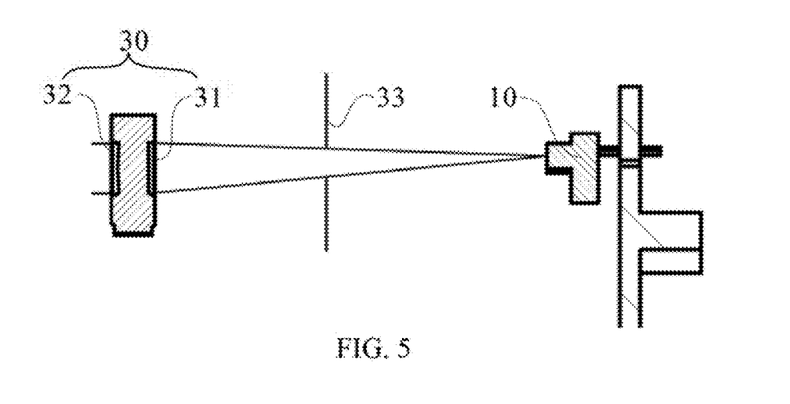
FIG. 5 illustrates a schematic of a light beam passing through a first optical unit according to various embodiments of the present disclosure.

Optionally, as shown in FIG. 5, an aperture diaphragm 33 may be arranged between the first optical unit 30 and the light source 10; or as shown in FIG. 3, an aperture diaphragm 33 may be arranged between the first optical unit 30 and the optical deflector 20.

It should be noted that, firstly, each component may be fixedly installed on the support unit 50, such that the aperture diaphragm 33 may be the hole-structure installed in the direction of the light path corresponding to the support unit 50. The aperture diaphragm may block the edge light, such that the light beam emitted from the light source 10 may pass through the aperture diaphragm into a preset spot shape. Exemplarily, the aperture diaphragm 33 may be configured as a circular aperture diaphragm, an elliptical aperture diaphragm, a square aperture diaphragm, or the like. The shape of the aperture diaphragm may not particularly be limited, and those skilled in the art may make suitable adjustments according to actual situations.

Secondly, as shown in FIG. 5, the aperture diaphragm 33 may be arranged between the first optical unit 30 and the light source 10 to constrain the light beam emitted from the light source 10. Or, as shown in FIG. 3, the aperture diaphragm 33 may also be arranged between the first optical unit 30 and the optical deflector 20; and the light beam that enters the optical deflector 20 after being modulated by the first optical unit 30 may also be constrained correspondingly. Obviously, the light beam emitted from the light source 10 may not be restricted, that is, the aperture diaphragm 33 may also be omitted.

Another aspect of embodiments of the present disclosure provides an electrophotographic image forming apparatus 200. The electrophotographic image forming apparatus 200 may include the above-mentioned optical scanner 100, and further include a photosensitive unit 210 capable of forming a latent image on the surface of the scanning target, a developing unit 220 that develops the latent image on the photosensitive unit 210 into a toner image, a transfer apparatus 230 that transfers the toner image to a transfer medium, and a fixing apparatus 240 that fixes the toner image on the transfer medium.

In order to print the image, the light scanning unit may emit the light beam to scan the photosensitive unit 210. The photosensitive unit 210 may be an example of a photoreceptor. The photosensitive unit 210 may include a cylindrical metal tube having an outer circumference, and a photosensitive layer having a preset thickness may be formed on the outer circumference. A charging roller 250 may rotate and contact the photosensitive unit 210 and charge the surface of the photosensitive unit 210 to a uniform potential. The light scanning unit may scan the light beam modulated according to the image information in the main scanning direction, thereby forming an electrostatic latent image on the image forming surface of the photosensitive unit 210. In such case, as the photosensitive unit 210 rotates, the image forming surface may move in the sub scanning direction, and the light scanning unit may be synchronized with the horizontal synchronization signal to scan the light beam onto the image forming surface in the main scanning direction. Therefore, a two-dimensional electrostatic latent image may be formed on the image forming surface of the photosensitive unit 210.

The developing unit 220 may contact the photosensitive unit 210 and transfer the toner medium to the surface of the photosensitive unit 210, thereby forming a printed image. As the photosensitive unit 210 rotates, the toner medium image on the surface of the photosensitive unit 210 may be deflected onto a recording medium 270. The transfer roller may have a certain deflection voltage, so that the medium image on the surface of the photosensitive unit 210 may be more easily attracted to the recording medium 270; and after the transferring, the remaining medium on the surface of the photosensitive unit 210 may be removed by a cleaning unit 260. The toner medium image transferred to the recording medium 270 maybe fixed to the recording medium 270 by heating and pressing by the fixing unit, thereby completing the printing operation.

The electrophotographic image forming apparatus 200 may include the same structure and beneficial effects as the optical scanner 100 in the above-mentioned embodiments. The structure and beneficial effects of the optical scanner 100 may have been described in detail in the above-mentioned embodiments, which may not be described in detail herein.

The above may only be optional embodiments of the present disclosure and are not used to limit the present disclosure. For those skilled in the art, the present disclosure may have various modifications and changes. Any modification, equivalent replacement, improvement and the like made within the spirit and principle of the present disclosure shall be included in the scope of protection of the present disclosure.

What is claimed is:

1. An optical scanner, comprising:
   a light source, configured to emit a light beam;
   an optical deflector, configured to deflect the light beam emitted from the light source;
   a first optical unit, arranged between the light source and the optical deflector, wherein the first optical unit includes a refraction unit and a diffraction unit, and wherein the light beam emitted from the light source sequentially passes through the refraction unit and the diffraction unit; and
   a second optical unit, arranged in a light exit direction of the optical deflector and configured to make the light beam deflected by the optical deflector form an image on a scanning target surface, wherein:
   a ratio of a refractive power $\Phi_r$ to a diffractive power $\Phi_d$ of the first optical unit in a main scanning direction is in a range of $0.3<\Phi_r/\Phi_d<0.5$; and
   a ratio of a refractive power $\Phi_s$ to a diffractive power $\Phi_n$ of the first optical unit in a sub scanning direction is in a range of $0.7<\Phi_s/\Phi_n<1.0$.

2. The optical scanner according to claim 1, wherein a ratio of the ratio $(\Phi_r/\Phi_d)$ of the refractive power $\Phi_r$ to the diffractive power $\Phi_d$ of the first optical unit in the main scanning direction and the ratio $(\Phi_s/\Phi_n)$ of the refractive power $\Phi_s$ to the diffractive power $\Phi_n$ of the first optical unit in the sub scanning direction is in a range of $0.3<(\Phi_r/\Phi_d)/(\Phi_s/\Phi_n)<0.5$.

3. The optical scanner according to claim 2, wherein: $0.35<(\Phi_r/\Phi_d)/(\Phi_s/\Phi_n)<0.45$.

4. The optical scanner according to claim 1, wherein a wavelength change of the light source caused by a temperature change is $d\lambda/dT$, wherein $d\lambda/dT<0.25$.

5. The optical scanner according to claim 1, wherein the first optical unit includes an anamorphic lens.

6. The optical scanner according to claim 5, wherein the first optical unit is made of a plastic material; and the refraction unit and the diffraction unit are formed into a single piece on an incident light side and an exit light side of the anamorphic lens by injection molding.

7. The optical scanner according to claim 6, wherein:
   an aperture diaphragm is arranged between the light source and the first optical unit; or
   an aperture diaphragm is arranged between the first optical unit and the optical deflector.

8. The optical scanner according to claim 1, wherein: $0.35<\Phi_r/\Phi_d<0.45$ and $0.98<\Phi_s/\Phi_n<1$.

9. The optical scanner according to claim 1, wherein the refraction unit is positioned at a first surface of the first optical unit, the diffraction unit is positioned at a second surface of the first optical unit, and the first surface is positioned between the second surface and the light source.

10. An electrophotographic image forming apparatus, comprising:
    an optical scanner, comprising:
    a light source, configured to emit a light beam; and
    an optical deflector, configured to deflect the light beam emitted from the light source;
    a first optical unit, arranged between the light source and the optical deflector, wherein the first optical unit includes a refraction unit and a diffraction unit, and wherein the light beam emitted from the light source sequentially passes through the refraction unit and the diffraction unit; and
    a second optical unit, arranged in a light exit direction of the optical deflector and configured to make the light beam deflected by the optical deflector form an image on a scanning target surface, wherein:
    a ratio of a refractive diopter $\Phi_r$ to a diffractive diopter $\Phi_d$ of the first optical unit in a main scanning direction is in a range of $0.3<\Phi_r/\Phi_d<0.5$; and
    a ratio of a refractive diopter $\Phi_s$ to a diffractive diopter $\Phi_n$ of the first optical unit in a sub scanning direction is in a range of $0.7<\Phi_s/\Phi_n<1.0$; and the electrophotographic image forming apparatus further comprising:
    a photosensitive unit capable of forming a latent image on a scanning target surface,
    a developing unit that develops the latent image on the photosensitive unit into a toner image,
    a transfer apparatus that transfers the toner image to a transfer medium, and
    a fixing apparatus that fixes the toner image on the transfer medium.

11. The apparatus according to claim 10, wherein a ratio of the ratio $(\Phi_r/\Phi_d)$ of the refractive power $\Phi_r$ to the diffractive power $\Phi_d$ of the first optical unit in the main scanning direction and the ratio $(\Phi_s/\Phi_n)$ of the refractive power $\Phi_s$ to the diffractive power $\Phi_n$ of the first optical unit in the sub scanning direction is in a range of $0.3<(\Phi_r/\Phi_d)/(\Phi_s/\Phi_n)<0.5$.

* * * * *